US012669364B2

(12) United States Patent     (10) Patent No.:   US 12,669,364 B2
Chen et al.     (45) Date of Patent:   Jun. 30, 2026

(54) METHOD, DEVICE, STORAGE MEDIUM, AND ELECTRONIC EQUIPMENT FOR DETECTING PIPE WALL DIRT

(71) Applicants: CHENGDU SEA PIONEERS TECHNOLOGY CO., LTD., Chengdu (CN); WUXI SEA PIONEERS TECHNOLOGY CO., LTD., Wuxi (CN)

(72) Inventors: Jige Chen, Chengdu (CN); Lang Liu, Chengdu (CN); Chao Luo, Chengdu (CN); Bin Xu, Chengdu (CN)

(73) Assignees: CHENGDU SEA PIONEERS TECHNOLOGY CO., LTD., Chengdu Sichuan (CN); WUXI SEA PIONEERS TECHNOLOGY CO., LTD., Wuxi Jiangsu (CN)

( * ) Notice: Subject to any disclaimer, the term of this patent is extended or adjusted under 35 U.S.C. 154(b) by 465 days.

(21) Appl. No.: 18/388,658

(22) Filed: Nov. 10, 2023

(65) Prior Publication Data

US 2025/0027806 A1     Jan. 23, 2025

(30) Foreign Application Priority Data

Jul. 18, 2023    (CN) ......................... 202310876539.2

(51) Int. Cl.
    *G01F 25/10*     (2022.01)
    *G01F 1/36*     (2006.01)

(52) U.S. Cl.
    CPC ................ *G01F 25/10* (2022.01); *G01F 1/36* (2013.01)

(58) Field of Classification Search
    None
    See application file for complete search history.

(56) References Cited

U.S. PATENT DOCUMENTS

| | | | |
|---|---|---|---|
| 12,013,273 B2* | 6/2024 | Mahalingam | G01F 1/34 |
| 2011/0167910 A1* | 7/2011 | Storm | G01F 1/8495 |
| | | | 73/152.58 |

(Continued)

FOREIGN PATENT DOCUMENTS

| | | |
|---|---|---|
| AU | 2008265939 A1 | 12/2008 |
| CA | 2725061 A1 | 8/2009 |

(Continued)

OTHER PUBLICATIONS

First Office Action, dated Aug. 18, 2023, issued in corresponding Chinese Patent Application No. 2023108765392, Filed Jul. 18, 2023, along with an English translation.

(Continued)

*Primary Examiner* — Peter J Macchiarolo
*Assistant Examiner* — Jermaine L Jenkins
(74) *Attorney, Agent, or Firm* — PERRY + CURRIER INC.

(57) ABSTRACT

A method, a device, a storage medium, and electronic equipment for detecting pipe wall dirt are provided. In the above, the electronic equipment acquires a first receiving amount of a target pipeline for first light quanta currently; acquires a second receiving amount of the target pipeline for the first light quanta at a reference moment; and obtains an increased dirt thickness of the target pipeline in a target time period according to the first receiving amount and the second receiving amount, wherein the target time period represents a time length from a current moment to the reference moment.

20 Claims, 3 Drawing Sheets

Acquire a first receiving amount of the target pipeline for the first light quanta currently    ~S101

Acquire a second receiving amount of the target pipeline for the first light quanta at a reference moment    ~S102

Obtain an increased dirt thickness of the target pipeline in a target time period according to the first receiving amount and the second receiving amount, wherein the target time period represents a time length from a current moment to the reference moment    ~S103

(56) References Cited

U.S. PATENT DOCUMENTS

| | | | | |
|---|---|---|---|---|
| 2016/0115395 A1* | 4/2016 | Rustad | .................. | C10G 33/08 |
| | | | | 700/282 |
| 2019/0219432 A1* | 7/2019 | Chen | ......................... | G01F 1/88 |

FOREIGN PATENT DOCUMENTS

| CN | 105683500 A | 6/2016 | | |
|---|---|---|---|---|
| CN | 106576147 A | 4/2017 | | |
| CN | 106662436 A | 5/2017 | | |
| CN | 109000792 A | 12/2018 | | |
| CN | 208270429 U | 12/2018 | | |
| CN | 110146521 A | 8/2019 | | |
| CN | 110243765 A | 9/2019 | | |
| CN | 110879229 A | 3/2020 | | |
| CN | 215420600 U | 1/2021 | | |
| CN | 112857609 A | 5/2021 | | |
| CN | 112881525 A | 8/2021 | | |
| CN | 113945248 A | 1/2022 | | |
| CN | 113984719 A | 1/2022 | | |
| CN | 216051379 U | 3/2022 | | |
| CN | 115900606 A | 4/2023 | | |
| CN | 115930852 A | 4/2023 | | |
| CN | 115993102 A | 4/2023 | | |
| CN | 116046979 A | 5/2023 | | |
| CN | 116878624 A * | 10/2023 | ............ | G01F 25/10 |
| KR | 20040048261 A | 6/2004 | | |
| KR | 20060135281 A | 12/2006 | | |
| WO | 2010059065 A1 | 5/2010 | | |
| WO | 2014081315 A2 | 5/2014 | | |
| WO | 2015084348 A1 | 6/2015 | | |
| WO | 2020214550 A1 | 10/2020 | | |

OTHER PUBLICATIONS

Notice of Grant of Invention Patent Right, dated Aug. 30, 2023, issued in corresponding Chinese Patent Application No. 2023108765392, Filed Jul. 18, 2023, along with an English translation.

\* cited by examiner

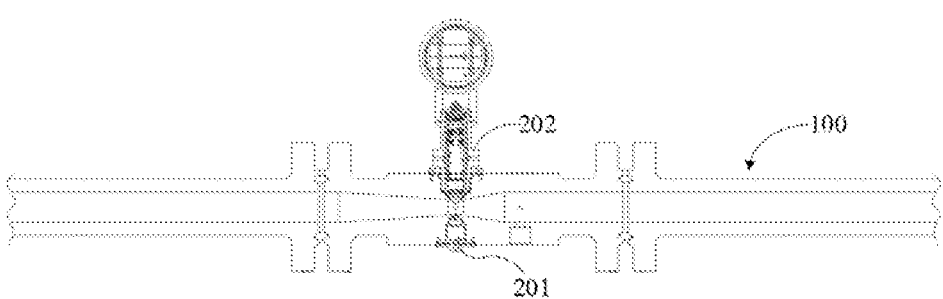

FIG. 4

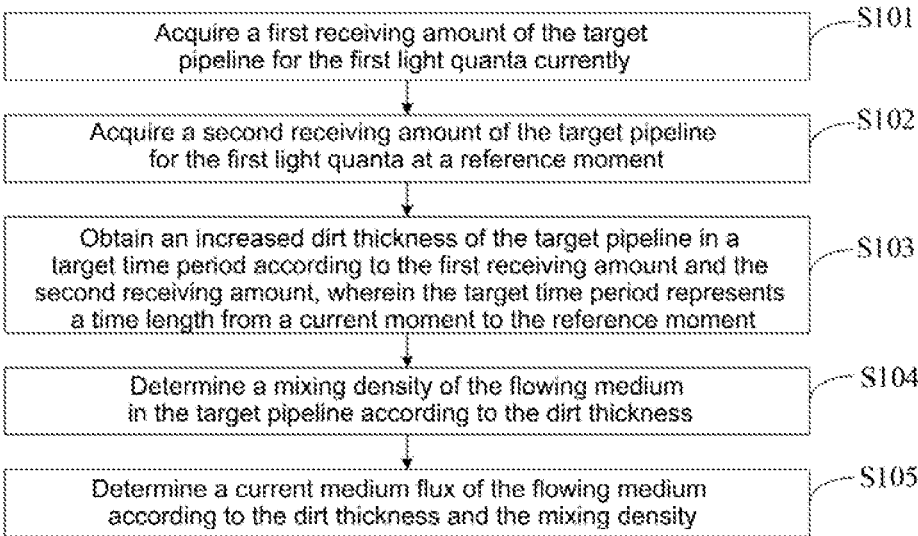

| | |
|---|---|
| Acquire a first receiving amount of the target pipeline for the first light quanta currently | S101 |
| Acquire a second receiving amount of the target pipeline for the first light quanta at a reference moment | S102 |
| Obtain an increased dirt thickness of the target pipeline in a target time period according to the first receiving amount and the second receiving amount, wherein the target time period represents a time length from a current moment to the reference moment | S103 |
| Determine a mixing density of the flowing medium in the target pipeline according to the dirt thickness | S104 |
| Determine a current medium flux of the flowing medium according to the dirt thickness and the mixing density | S105 |

FIG. 5

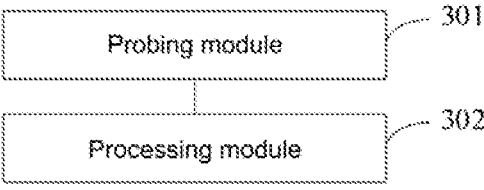

FIG. 6

METHOD, DEVICE, STORAGE MEDIUM, AND ELECTRONIC EQUIPMENT FOR DETECTING PIPE WALL DIRT

TECHNICAL FIELD

The present disclosure relates to the field of measurement of miscible fluid, and in particular, to a method, a device, a storage medium, and electronic equipment for detecting pipe wall dirt.

BACKGROUND ART

Currently, metering principle of miscible phase and differential pressure type flowmeters are based on Venturi flux calculation formula as shown below:

$$Q_m = \frac{C}{\sqrt{1-\beta^4}} \varepsilon \frac{\pi}{4} d^2 \sqrt{2\Delta P \rho};$$

in the formula, $Q_m$ represents mass flux, with unit kg/s, C represents discharge coefficient, $\beta$ represents throat diameter ratio, $\varepsilon$ represents expansion coefficient, $\Delta P$ represents pressure difference value between a Venturi upstream pressure tap and a Venturi throat diameter position, with unit Pa, which is dependent on design of a main structure of the flowmeter, and $\rho$ represents density of medium at the Venturi upstream pressure tap.

Therefore, the principle of differential pressure created by the flowmeter is based on Bernoulli equation and fluid continuity equation. According to the throttling principle, when a fluid flows through a throttling member (such as standard pore plate, standard nozzle, long-diameter nozzle, classic Venturi mouth, and Venturi nozzle), a differential pressure is generated before and after the throttling element, and this differential pressure value is directly proportional to the square of flux. Therefore, fluids of the same volume and mass have different flow velocities when passing through different inner diameters and different throttles.

However, during oil and gas field development, a fluid (oil, gas, water) in oil-gas reservoir flows out from oil-gas bed (hydrocarbon reservoir), and passes through a wellbore and a wellhead to reach a surface gathering system, wherein deposition phenomenon of inorganic salts (for example, bicarbonates, carbonates, sulfates, chlorides, phosphates, and silicates) is prone to occur due to changes of temperature, pressure, and oil-gas-water balance state, and the fluid is finally attached to a pipe wall to form dirt. The occurrence of scaling phenomenon will reduce throat diameter of pipeline, increase resistance of the fluid in the pipeline, slow down flow velocity of the fluid, further affect working efficiency of circulation system, and increase operation cost of the system, and even may bring about many risks of production and operation. Therefore, it is of great practical significance to study how to measure the dirt.

SUMMARY

In order to overcome at least one deficiency in the prior art, the present disclosure provides a method, a device, a storage medium, and electronic equipment for detecting pipe wall dirt, specifically including the follows.

In a first aspect, the present disclosure provides a method for detecting pipe wall dirt, wherein the method includes:

acquiring a first receiving amount of a target pipeline for first light quanta currently;

acquiring a second receiving amount of the target pipeline for the first light quanta at a reference moment; and obtaining an increased dirt thickness of the target pipeline in a target time period according to the first receiving amount and the second receiving amount, wherein the target time period represents a time length from a current moment to the reference moment.

In combination with an optional embodiment of the first aspect, an equation of obtaining the increased dirt thickness of the target pipeline in the target time period according to the first receiving amount and the second receiving amount is:

$$d_s \ln\left(\frac{N_{old}^{356}}{N_{new}^{356}}\right) \Big/ u_s;$$

in the equation, $d_s$ represents the dirt thickness, $$N_{new}^{356}$$

represents the first receiving amount, $$N_{old}^{365}$$

represents the second receiving amount, and $u_s$ represents absorption coefficient of dirt to the light quanta.

In combination with an optional embodiment of the first aspect, the method further includes:

determining a mixing density of a flowing medium according to the dirt thickness; and determining a current medium flux of the flowing medium according to the dirt thickness and the mixing density.

In combination with an optional embodiment of the first aspect, the step of determining a mixing density of a flowing medium according to the dirt thickness includes:

determining a medium thickness of each component in the flowing medium according to the dirt thickness;

determining a volume phase fraction of respective component according to the medium thickness of each component; and determining the mixing density of the flowing medium according to the volume phase fraction of the respective component.

In combination with an optional embodiment of the first aspect, the flowing medium is a miscible fluid exploited from oil and gas fields, components in the miscible fluid include gas, oil, and water, and the step of determining a medium thickness of each component in the flowing medium according to the dirt thickness includes:

acquiring a third receiving amount of the target pipeline for second light quanta currently, and a fourth receiving amount of the target pipeline for the second light quanta when the target pipeline is currently in an empty state;

acquiring a fifth receiving amount of the target pipeline for third light quanta currently, and a sixth receiving amount of the target pipeline for the third light quanta when the target pipeline is currently in an empty state; and

determining respective medium thickness of the gas, the oil, and the water according to the third receiving amount, the fourth receiving amount, the fifth receiving amount, the sixth receiving amount, and the dirt thickness, with equations as follows:

$$d_o = \frac{A_{12a} * B_b - A_{12b} * B_a}{A_{12a} * A_{13b} - A_{12b} * A_{13a}}$$

$$d_w = \frac{A_{13a} * B_b - A_{13b} * B_b}{A_{12b} * A_{13a} - A_{13b} * A_{12a}}$$

$$d_g = 1 - d_o + d_w$$

$$A_{13a} = u_{g31} - u_{o31}$$

$$A_{13b} = u_{g81} - u_{o81}$$

$$A_{12a} = u_{g31} - u_{w81}$$

$$A_{12b} = u_{g81} - u_{w81}$$

$$B_a = d * u_{g31} - \ln\left(\frac{N_{31}}{N_{new}^{31}}\right)$$

$$B_b = d * u_{g81} - \ln\left(\frac{N_{81}}{N_{new}^{81}}\right);$$

in the equations, d represents initial throat diameter of a Venturi throat diameter position in the target pipeline, and $d_o$ represents the medium thickness of the oil; $d_g$ represents thickness of the gas; $d_w$ represents the medium thickness of the water;

$$N_{new}^{31}$$

represents the third receiving amount, $N_{31}$ represents the fourth receiving amount;

$$N_{new}^{81}$$

represents the fifth receiving amount; $N_{81}$ represents the sixth receiving amount; $u_{o31}$ represents absorption coefficient of the oil to the second light quanta, and $u_{g31}$ represents absorption coefficient of the gas to the second light quanta; $u_{w31}$ represents absorption coefficient of the water to the second light quanta; $u_{o81}$ represents absorption coefficient of the oil to the third light quanta, and $u_{g81}$ represents absorption coefficient of the gas to the third light quanta; $u_{w81}$ represents absorption coefficient of the water to the third light quanta, $A_{13a}$ represents alternative variable of formula $u_{g31}-u_{o31}$, $A_{13b}$ represents alternative variable of formula $u_{g81}-u_{o81}$, $A_{12a}$ represents alternative variable of formula $u_{g31}-u_{w81}$, $A_{12b}$ represents alternative variable of formula $u_{g81}-u_{w81}$, $B_a$ represents alternative variable of formula $$d * u_{g31} - \ln\left(\frac{N_{31}}{N_{new}^{31}}\right),$$

4 and $B_b$ represents alternative variable of formula $$d * u_{g81} - \ln\left(\frac{N_{81}}{N_{new}^{81}}\right).$$

In combination with an optional embodiment of the first aspect, the flowing medium is a miscible fluid exploited from oil and gas fields, components of the miscible fluid include gas, oil, and water, and an equation of determining a mixing density of the flowing medium according to the volume phase fraction of the respective component is as follows:

$$\rho_{mis} = GVF * \rho_g + WVF * \rho_w + OVF * \rho_o;$$

in the equation, $\rho_{mis}$ represents the mixing density; GVF represents volume phase fraction of the gas, WVF represents volume phase fraction of the water, and OVF represents volume phase fraction of the oil; $\rho_g$ represents density of the gas, $\rho_w$ represents density of the water, and $\rho_o$ represents density of the oil.

In an optional embodiment of the first aspect, equations of determining a current medium flux of the flowing medium according to the dirt thickness and the mixing density are as follows:

$$Q_v = \frac{C}{\sqrt{1 - \beta^4}} \varepsilon \frac{\pi}{4} (d - d_s)^2 \sqrt{\frac{2\Delta P}{\rho_{mis}}}$$

$$\beta = \frac{d - d_s}{D - d_s};$$

in the equations, $Q_v$ represents current total volume flux of the flowing medium, C represents discharge coefficient, $\varepsilon$ represents expansion coefficient, $\Delta p$ represents pressure difference value between an upstream pressure tap and a Venturi throat diameter position, $\rho_{mis}$ represents the mixing density, $d_s$ represents the dirt thickness, d represents initial throat diameter at Venturi throat diameter in the target pipeline, and D represents throat diameter of a Venturi straight pipeline section in the target pipeline.

In a second aspect, the present disclosure provides a device for detecting pipe wall dirt, wherein the device includes:

a probing module, configured to acquire a first receiving amount of a target pipeline for first light quanta currently, wherein the probing module is further configured to acquire a second receiving amount of the target pipeline for the first light quanta at a reference moment; and a processing module, configured to obtain an increased dirt thickness of the target pipeline in a target time period according to the first receiving amount and the second receiving amount, wherein the target time period represents a time length from a current moment to the reference moment.

In combination with an optional embodiment of the second aspect, an equation of obtaining the increased dirt thickness of the target pipeline in the target time period according to the first receiving amount and the second receiving amount is:

$$d_s = \ln\left(\frac{N_{old}^{356}}{N_{new}^{356}}\right)\Big/ u_s;$$

in the equation, $d_s$ represents the dirt thickness, $$N_{new}^{356}$$

represents the first receiving amount, $$N_{old}^{365}$$

represents the second receiving amount, and $u_s$ represents absorption coefficient of dirt to the light quanta.

In combination with an optional embodiment of the second aspect, the processing module is further configured to:

determine a mixing density of a flowing medium according to the dirt thickness; and determine a current medium flux of the flowing medium according to the dirt thickness and the mixing density.

In combination with an optional embodiment of the second aspect, the processing module is further configured to:

determine a medium thickness of each component in the flowing medium according to the dirt thickness;

determine a volume phase fraction of respective component according to the medium thickness of each component; and determine the mixing density of the flowing medium according to the volume phase fraction of the respective component.

In combination with an optional embodiment of the second aspect, the flowing medium is a miscible fluid exploited from oil and gas fields, components in the miscible fluid include gas, oil, and water, and the processing module is further configured to:

acquire a third receiving amount of the target pipeline for second light quanta currently, and a fourth receiving amount of the target pipeline for the second light quanta when the target pipeline is currently in an empty state;

acquire a fifth receiving amount of the target pipeline for third light quanta currently, and a sixth receiving amount of the target pipeline for the third light quanta when the target pipeline is currently in an empty state; and determine respective medium thickness of the gas, the oil, and the water according to the third receiving amount, the fourth receiving amount, the fifth receiving amount, the sixth receiving amount, and the dirt thickness, with equations as follows:

$$d_o = \frac{A_{12a}*B_b - A_{12b}*B_a}{A_{12a}*A_{13b} - A_{12b}*A_{13a}}$$

$$d_w = \frac{A_{13a}*B_b - A_{13b}*B_b}{A_{12b}*A_{13a} - A_{13b}*A_{12a}}$$

$$d_g = 1 - d_o + d_w$$

$$A_{13a} = u_{g31} - u_{o31}$$

6

-continued $$A_{13b} = u_{g81} - u_{o81}$$

$$A_{12a} = u_{g31} - u_{w81}$$

$$A_{12b} = u_{g81} - u_{w81}$$

$$B_a = d*u_{g31} - \ln\left(\frac{N_{31}}{N_{new}^{31}}\right)$$

$$B_b = d*u_{g81} - \ln\left(\frac{N_{81}}{N_{new}^{81}}\right);$$

in the equations, d represents initial throat diameter of a Venturi throat diameter position in the target pipeline, and $d_o$ represents the medium thickness of the oil; $d_g$ represents thickness of the gas; $d_w$ represents the medium thickness of the water;

$$N_{new}^{31}$$

represents the third receiving amount, $N_{31}$ represents the fourth receiving amount;

$$N_{new}^{81}$$

represents the fifth receiving amount; $N_{81}$ represents the sixth receiving amount; $u_{o31}$ represents absorption coefficient of the oil to the second light quanta, and $u_{g31}$ represents absorption coefficient of the gas to the second light quanta; $u_{w31}$ represents absorption coefficient of the water to the second light quanta; $u_{o81}$ represents absorption coefficient of the oil to the third light quanta, and $u_{g81}$ represents absorption coefficient of the gas to the third light quanta; $u_{w81}$ represents absorption coefficient of the water to the third light quanta, $A_{13a}$ represents alternative variable of formula $u_{g3} - u_{o31}$, $A_{13b}$ represents alternative variable of formula $u_{g81} - u_{o81}$, $A_{12a}$ represents alternative variable of formula $u_{g31} - u_{w81}$, $A_{12b}$ represents alternative variable of formula $u_{g81} - u_{w81}$, $B_a$ represents alternative variable of formula $$d*u_{g31} - \ln\left(\frac{N_{31}}{N_{new}^{31}}\right),$$

and $B_b$ represents alternative variable of formula $$d*u_{g81} - \ln\left(\frac{N_{81}}{N_{new}^{81}}\right).$$

In combination with an optional embodiment of the second aspect, the flowing medium is a miscible fluid exploited from oil and gas fields, components of the miscible fluid include gas, oil, and water, and an equation of determining a mixing density of the flowing medium according to the volume phase fraction of the respective component is as follows:

$$\rho_{mis} = GVF*\rho_g + WVF*\rho_w + OVF*\rho_o;$$

in the equation, $\rho_{mis}$ represents the mixing density; GVF represents volume phase fraction of the gas, WVF represents volume phase fraction of the water, and OVF represents volume phase fraction of the oil; $\rho_g$ represents density of the gas, $\rho_w$ represents density of the water, and $\rho_o$ represents density of the oil.

In combination with an optional embodiment of the second aspect, equations of determining a current medium flux of the flowing medium according to the dirt thickness and the mixing density are as follows:

$$Q_v = \frac{C}{\sqrt{1-\beta^4}} \varepsilon \frac{\pi}{4} (d - d_s)^2 \sqrt{\frac{2\Delta P}{\rho_{mis}}}$$

$$\beta = \frac{d - d_s}{D - d_s};$$

in the equations, $Q_v$ represents current total volume flux of the flowing medium, C represents discharge coefficient, $\varepsilon$ represents expansion coefficient, $\Delta p$ represents pressure difference value between an upstream pressure tap and a Venturi throat diameter position, $\rho_{mis}$ represents the mixing density, $d_s$ represents the dirt thickness, d represents initial throat diameter at Venturi throat diameter in the target pipeline, and D represents throat diameter of a Venturi straight pipeline section in the target pipeline.

In a third aspect, the present disclosure provides a storage medium. The storage medium stores a computer program, and when the computer program is executed by a processor, the method for detecting pipe wall dirt is implemented.

In a fourth aspect, the present disclosure provides electronic equipment. The electronic equipment includes a processor and a memory, the memory stores a computer program, and when the computer program is executed by the processor, the method for detecting pipe wall dirt is implemented.

Compared with the prior art, the present disclosure has the following beneficial effects.

The present disclosure provides the method, the device, the storage medium, and the electronic equipment for detecting pipe wall dirt. In the above, the electronic equipment acquires the first receiving amount of the target pipeline for the first light quanta currently; acquires the second receiving amount of the target pipeline for the first light quanta at the reference moment; and obtains the increased dirt thickness of the target pipeline in the target time period according to the first receiving amount and the second receiving amount, wherein the target time period represents the time length from current moment to the reference moment. In this way, since a difference between the first receiving amount and the second receiving amount is actually caused by the dirt attached to the pipe wall of the target pipeline, a thickness of the dirt attached to the pipe wall can be determined according to the first receiving amount and the second receiving amount.

BRIEF DESCRIPTION OF DRAWINGS

In order to more clearly illustrate technical solutions of embodiments of the present disclosure, drawings which need to be used in the embodiments will be briefly introduced below, and it should be understood that the drawings below merely show some embodiments of the present disclosure, therefore, they should not be considered as limitation to the scope, and those ordinarily skilled in the art still could obtain other relevant drawings according to these drawings, without using any inventive efforts.

FIG. 4 is a schematic diagram of probing principle of light quantum loss provided in an embodiment of the present disclosure;

FIG. 5 is a second flowchart of the method for detecting pipe wall dirt provided in an embodiment of the present disclosure;

FIG. 6 is a structural schematic diagram of a device for detecting pipe wall dirt provided in an embodiment of the present disclosure.

Figure 1:
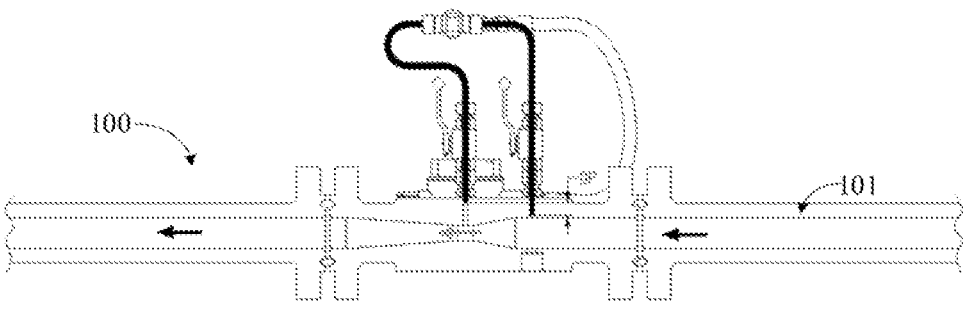
FIG. 1 is a schematic diagram of a pipeline just put into use provided in an embodiment of the present disclosure.

Reference signs: 100—target pipeline; 101—pipe wall; 102—dirt; 201—light quantum emission source; 202—light quantum prober; 301—probing module; 302—processing module; 401—memory; 402—processor; 403—communication unit; 404—system bus.

DETAILED DESCRIPTION OF EMBODIMENTS

In order to make the objectives, technical solutions, and advantages of the embodiments of the present disclosure clearer, the technical solutions in the embodiments of the present disclosure will be described clearly and completely below in combination with the drawings in the embodiments of the present disclosure, and apparently, the embodiments described are some but not all embodiments of the present disclosure. Generally, components in the embodiments of the present disclosure, as described and shown in the drawings herein, may be arranged and designed in various different configurations.

Therefore, the detailed description below of the embodiments of the present disclosure provided in the drawings is not intended to limit the claimed scope of the present disclosure, but merely illustrates chosen embodiments of the present disclosure. All of other embodiments obtained by those ordinarily skilled in the art based on the embodiments in the present disclosure without using any inventive efforts shall fall within the scope of protection of the present disclosure.

It should be noted that similar reference signs and letters represent similar items in the following drawings, therefore, once a certain item is defined in one drawing, it is not needed to be further defined or explained in subsequent drawings.

In the description of the present disclosure, it should be noted that terms such as "first", "second", and "third" are used only for distinguishing the description, and should not be understood as indicating or implying importance in relativity. Besides, terms "include", "contain" or any other variations thereof are intended to be non-exclusive, thus a process, a method, an article or a device including a series of elements not only includes those elements, but also includes other elements that are not listed explicitly, or further includes elements inherent to such process, method, article or device. Without more restrictions, an element defined with wordings "including a . . . " does not exclude presence of other same elements in the process, method, article or device including the element.

Based on the above statements, as shown in FIG. 1, in an industrial metering application site involved in oil and gas field development, a target pipeline 100 is designed, and a measurement aperture, a throttling ratio, and a differential pressure range of a flowmeter are defined according to site operation conditions, so as to accurately know a set range of the flowmeter. In this case, since the target pipeline 100 is just put into use, and the pipe wall 101 has not been attached by dirt, a flux of a fluid medium in the target pipeline 100 can be accurately measured within the set range of the flowmeter in an initial stage of use.

Figure 2:
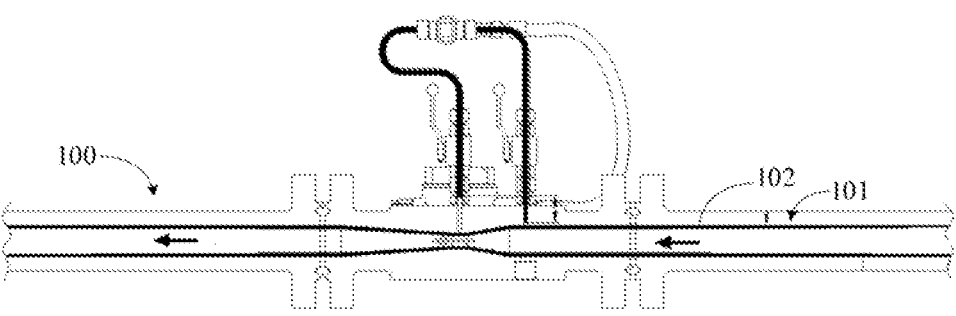
FIG. 2 is a schematic diagram of the pipeline attached by dirt provided in an embodiment of the present disclosure.

However, as shown in FIG. 2, the fluid medium (oil, gas, and water) in the oil-gas reservoir flows out from oil-gas bed, passes through a wellbore and a wellhead to reach a surface gathering system, wherein inorganic salts are prone to deposit due to changes of temperature, pressure, and oil-gas-water balance state, and is attached to a pipe wall 101 to form dirt 102. However, the occurrence of scaling phenomenon will adversely affect production, resulting in reduced production yield, inability to operate normally and continuously, and even shutdown, leading to premature failure of oil-gas wells and equipment. That is, in the industrial field, if water with hardness (hard water) enters the target pipeline 100 for fluid transportation without treatment, after a certain period of operation, the pipe wall of the target pipeline 100 in contact with the fluid will be firmly attached by some solid deposits, which is because various salts, such as bicarbonates, carbonates, sulfates, chlorides, phosphates, and silicates, are dissolved in natural water, wherein bicarbonates existing in a dissolved form, such as calcium hydrogen carbonate and magnesium hydrogen carbonate, are the most unstable, and are prone to decompose and generate insoluble carbonates, which are attached to the pipe wall 101 to form the dirt 102.

With the lapse of time, the deposited dirt 102 is continuously increased, and a throat diameter in the pipe wall 101 of the target pipeline 100 is decreased as the scaling layer increases. In cases where the fluid is unchanged, a flow velocity of the fluid is accelerated, resulting in that a differential pressure of the fluid cannot perfectly reflect real condition of the flow velocity of the fluid. Therefore, studying measurement of the dirt is of great significance for obtaining real flux of the fluid medium in the target pipeline 100.

It is worth indicating that based on the discovery of the above technical problem, the inventors propose the following technical solutions after inventive efforts so as to solve or address the above problem. It should be noted that the above defects in the prior art scheme and the solutions thereof are all results obtained by the inventors after practices and careful researches. Therefore, all the discovery process of the above problem and the solutions in following embodiments of the present disclosure proposed for the above problem should be contributions made by the inventors to the present disclosure during creation of the invention, and should not be construed as technical contents well known to those skilled in the art.

In this regard, the present embodiment provides a method for detecting pipe wall dirt. In this method, electronic equipment acquires a first receiving amount of a target pipeline for first light quanta currently (at current moment); acquires a second receiving amount of the target pipeline for the first light quanta at a reference moment; and obtains an increased dirt thickness of the target pipeline in a target time period according to the first receiving amount and the second receiving amount, wherein the target time period represents a time length from current moment to the reference moment. In this way, since a difference between the first receiving amount and the second receiving amount is actually caused by dirt attached to a pipe wall of the target pipeline, a thickness of the dirt attached to the pipe wall can be determined according to the first receiving amount and the second receiving amount.

It should be understood that, in the present embodiment, any pipeline studied is called as target pipeline, and a fluid medium circulating in this target pipeline is not merely limited to a miscible fluid exploited from oil and gas fields. The electronic equipment may be a mobile terminal, a tablet computer, a laptop computer, a desktop computer, and a server that can be in communication connection with light quantum probing equipment, and also may be embedded equipment integrated in the light quantum probing equipment. When the electronic equipment is a server, it may be a single server or a server group. The server group may be centralized or distributed (e.g., the server may be a distributed system). In some embodiments, the server may be local or remote with respect to a user terminal. In some embodiments, the server can be implemented on a cloud platform; for example only, the cloud platform may include a private cloud, a public cloud, a hybrid cloud, a community cloud, a distributed cloud, an inter-cloud, a multi-cloud, etc., or any combination thereof. In some embodiments, the server can be implemented on electronic equipment having one or more components.

Figure 3:
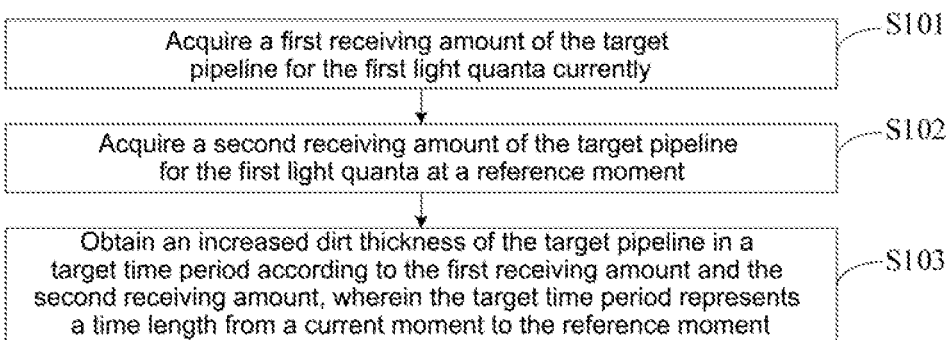
FIG. 3 is a first flowchart of a method for detecting pipe wall dirt provided in an embodiment of the present disclosure.

In order to make solutions provided in the present embodiment clearer, various steps of this method are described in detail below with reference to FIG. 3. But it should be understood that operations in each flowchart can be implemented out of order, and steps without contextual logical relationship can be reversed in order or simultaneously implemented. In addition, those skilled in the art, guided by contents of the present disclosure, could add one or more other operations to the flowchart, or remove one or more operations from the flowchart. As shown in FIG. 3, this method includes:

S101, acquiring a first receiving amount of the target pipeline for the first light quanta currently.

The so-called light quantum, abbreviated as photon, is elementary particle for transmitting electromagnetic interaction, and is a kind of gauge boson. Photon is a carrier of electromagnetic radiation, and in quantum field theory, photon is considered as medium of electromagnetic interaction. Compared with most elementary particles, a static mass of photon is zero, which means that its propagation velocity in vacuum is the speed of light. Like other quanta, photon has wave-particle duality: photon can show the properties of refraction, interference, and diffraction of classical waves, the particle nature of photon can be proved by photoelectric effect. Photon can only transfer quantized energy, which is a lattice particle, and is a mass energy phase of a loop quantum particle. The energy of a photon is proportional to frequency of light wave. The higher the frequency is, the higher the energy is. When one photon is absorbed by atom, there is one electron that gains enough energy so as to transition from inner orbit to outer orbit, and the atom with electronic transition changes from ground state to excited state.

In the present embodiment, the light quantum probing equipment may be a phase separator using Ba-133 (barium-133) as a light quantum source. The Ba-133 has radioactivity of 25 microcurie, and can emit nearly one million single light quanta of energy groups of 31 keV, 81 keV, and 356 keV per second. As shown in FIG. 4, the target pipeline 100 is located between a light quantum emission source 201 and a light quantum prober 202 of the phase separator, and light quanta of three energy levels 31 keV, 81 keV, and 356 keV are emitted. One part of these light quanta are absorbed by the pipeline, dirt of the pipe wall, and a flowing medium in the pipeline, and the other part pass through the pipeline and are received by the light quantum prober. Therefore, a loss amount of light quanta can reflect change of condition in the pipeline to a certain extent. Since the light quanta of energy level 356 keV can produce Compton effect, they are taken as the first light quanta in the present embodiment. Certainly, other radioactive sources also can be used to emit the light quanta, which is not specifically limited in the present embodiment.

Assume that this flowing medium is a miscible fluid exploited from oil and gas fields. For the target pipeline that is just put into use, the miscible fluid includes gas, oil, and water, and proportions of these components vary within a certain range, therefore, the loss amount of light quanta also fluctuates within a certain range. With the lapse of time, dirt is continuously increased on the pipe wall, and absorption capability of the dirt to the light quanta is much stronger than that of the miscible fluid, which then causes permanent loss of the light quanta, that is, the loss amount of light quanta is gradually increased over time.

Therefore, in conjunction with the above introduction to the first receiving amount, with continued reference to FIG. 3, this method further includes:

S102, acquiring a second receiving amount of the target pipeline for the first light quanta at a reference moment; and S103, obtaining an increased dirt thickness of the target pipeline in a target time period according to the first receiving amount and the second receiving amount, wherein the target time period represents a time length from a current moment to the reference moment.

In the above, an equation of obtaining the increased dirt thickness of the target pipeline in the target time period according to the first receiving amount and the second receiving amount is:

$$d_s = \ln\left(\frac{N_{old}^{356}}{N_{new}^{356}}\right) \Big/ u_s;$$

in the equation, $d_s$ represents the dirt thickness, $$N_{new}^{356}$$

represents the first receiving amount, $$N_{old}^{365}$$

represents the second receiving amount, and $u_s$ represents absorption coefficient of the dirt to the light quanta. When the reference moment is a moment when the target pipeline is just put into use, the dirt thickness is the increased thickness of dirt from the time when the target pipeline is put into use to the current time. As the dirt is continuously increased on the pipe wall and will cause permanent loss of the light quanta, the light quanta received will be gradually decreased over time. It can be understood as that the above second receiving amount $$N_{old}^{365}$$

is greater than the first receiving amount $$N_{new}^{356}$$

Based on the dirt thickness in the above embodiment, as shown in FIG. 5, this method further includes:

S104, determining a mixing density of the flowing medium in the target pipeline according to the dirt thickness.

In the above, as an optional embodiment, a specific implementation mode of step S104 includes:

S104-1, determining a medium thickness of each component in the flowing medium according to the dirt thickness.

Continue with the assumption that the flowing medium is a miscible fluid exploited from oil and gas fields, then components in the miscible fluid include gas, oil, and water. The electronic equipment can acquire a third receiving amount of the target pipeline for second light quanta currently, and a fourth receiving amount of the target pipeline for the second light quanta when the target pipeline is currently in an empty state; acquire a fifth receiving amount of the target pipeline for third light quanta currently and a sixth receiving amount of the target pipeline for the third light quanta when the target pipeline is currently in an empty state; and determine respective medium thickness of the gas, the oil, and the water according to the third receiving amount, the fourth receiving amount, the fifth receiving amount, the sixth receiving amount, and the dirt thickness.

It should be understood that when the target pipeline is currently in the empty state, the fourth receiving amount for the second light quanta in the empty state or the sixth receiving amount for the third light quanta in the empty state are caused by the target pipeline itself and the dirt on the pipe wall of the target pipeline. Assuming that: the second light quanta are light quanta of energy level 31 keV, the fourth receiving amount is expressed as $N_{31}$; the third light quanta are light quanta of energy level 356 keV, the sixth receiving amount is expressed as $N_{365}$, then calculation equations of the fourth receiving amount expressed as $N_{31}$ and the sixth receiving amount expressed as $N_{365}$ are as follows:

$$N_{31} = N_{31old} + \left(N_{31}^{new} - N_{31}^{old}\right)$$

$$N_{81} = N_{81old} + \left(N_{81}^{new} - N_{81}^{old}\right)$$

In the equations, $N_{31old}$ represents receiving amount of the target pipeline for the second light quanta in the empty state when the target pipeline is just put into use, and $$N_{31}^{new} - N_{31}^{old}$$

represents loss amount caused by the dirt to the second light quanta. By the same reasoning, $N_{81old}$ represents receiving amount of the target pipeline for the third light quanta in the empty state when the target pipeline is just put into use, and $$N_{81}^{new} - N_{81}^{old}$$

represents loss amount caused by the dirt to the second light quanta.

Exemplarily, continue with the assumption that the second light quanta are light quanta of energy level 31 keV, and the third light quanta are light quanta of energy level 356 keV, then the third receiving amount, the fourth receiving amount, the fifth receiving amount, the sixth receiving amount, and the dirt thickness and the respective medium thickness of the gas, the oil, and the water meet the following equation set:

$$u_{o31} * d_o + u_{g31} * d_g + u_{w31} * d_w = \ln\left(\frac{N_{31}}{N_{new}^{31}}\right)$$

$$u_{o81} * d_o + u_{g81} * d_g + u_{w81} * d_w = \ln\left(\frac{N_{81}}{N_{new}^{81}}\right)$$

$$d_o + d_g + d_w = d - d_s$$

For ease of calculation, auxiliary parameters are defined as follows:

$$A_{13a} = u_{g31} - u_{o31}$$

$$A_{13b} = u_{g81} - u_{o81}$$

$$A_{12a} = u_{g31} - u_{w81}$$

$$A_{12b} = u_{g81} - u_{w81}$$

$$B_a = d * u_{g31} - \ln\left(\frac{N_{31}}{N_{new}^{31}}\right)$$

$$B_b = d * u_{g81} - \ln\left(\frac{N_{81}}{N_{new}^{81}}\right)$$

By solving the above equation set, thickness of each component in the miscible fluid can be obtained:

$$d_o = \frac{A_{12a} * B_b - A_{12b} * B_a}{A_{12a} * A_{13b} - A_{12b} * A_{13a}}$$

$$d_w = \frac{A_{13a} * B_b - A_{13b} * B_b}{A_{12b} * A_{13a} - A_{13b} * A_{12a}}$$

$$d_g = 1 - d_o + d_w$$

In the equations, d represents initial throat diameter (i.e., throat diameter when no dirt is attached) of a Venturi throat diameter position in the target pipeline, and $d_o$ represents medium thickness of the oil; $d_g$ represents thickness of the gas; $d_w$ represents medium thickness of the water;

$$N_{new}^{31}$$

represents the third receiving amount, $N_{31}$ represents the fourth receiving amount;

$$N_{new}^{81}$$

represents the fifth receiving amount; $N_{81}$ represents the sixth receiving amount; $u_{o31}$ represents absorption coefficient of the oil to the second light quanta, and $u_{g31}$ represents absorption coefficient of the gas to the second light quanta; $u_{w31}$ represents absorption coefficient of the water to the second light quanta; $u_{o81}$ represents absorption coefficient of the oil to the third light quanta, and $u_{g81}$ represents absorption coefficient of the gas to the third light quanta; $u_{w81}$ represents absorption coefficient of the water to the third light quanta, $A_{13a}$ represents alternative variable of formula $u_{g31} - u_{o31}$, $A_{13b}$ represents alternative variable of formula $u_{g81} - u_{o81}$, $A_{12a}$ represents alternative variable of formula $u_{g31} - u_{w81}$, $A_{12b}$ represents alternative variable of formula $u_{g81} - u_{w81}$, $B_a$ represents alternative variable of formula $$d * u_{g31} - \ln\left(\frac{N_{31}}{N_{new}^{31}}\right),$$

and $B_b$ represents alternative variable of formula $$d * u_{g81} - \ln\left(\frac{N_{81}}{N_{new}^{81}}\right).$$

S104-2, determining a volume phase fraction of respective component according to the medium thickness of each component.

Continue to take the above instance as an example, calculation equations of the volume phase fraction of each component are as follows:

$$GVF = \frac{d_g}{d - d_s}$$

$$WVF = \frac{d_w}{d - ds}$$

$$OVF = \frac{d_o}{d - d_s};$$

in the equations, GVF represents volume phase fraction of the gas, WVF represents volume phase fraction of the water, and OVF represents volume phase fraction of the oil.

S104-3, determining a mixing density of the flowing medium according to the volume phase fraction of each component.

In the above, the volume phase fraction of each component and the mixing density of the flowing medium satisfy the following relationship:

$$\rho_{mis} = GVF * \rho_g + WVF * \rho_w + OVF * \rho_o;$$

in the equation, $\rho_{mis}$ represents the mixing density; GVF represents volume phase fraction of the gas, WVF represents volume phase fraction of the water, and OVF represents volume phase fraction of the oil; $\rho_g$ represents density of the gas, $\rho_w$ represents density of the water, and $\rho_o$ represents density of the oil.

S105, determining a current medium flux of the flowing medium according to the dirt thickness and the mixing density.

With regard to step S105, the current medium flux of the flowing medium may be a total volume flux or a total mass flux under the working condition; when it is the total volume flux, the dirt thickness, the mixing density, and the volume flux satisfy the following relationships:

$$Q_v = \frac{C}{\sqrt{1-\beta^4}} \varepsilon \frac{\pi}{4}(d-d_s)^2 \sqrt{\frac{2\Delta P}{\rho_{mis}}} \; ;$$

$$\beta = \frac{d-d_s}{D-d_s}$$

$Q_v$ represents current total volume flux of the flowing medium, C represents discharge coefficient, $\varepsilon$ represents expansion coefficient, $\Delta p$ represents pressure difference value between an upstream pressure tap and a Venturi throat diameter position, $\rho_{mis}$ represents the mixing density, $d_s$ represents the dirt thickness, d represents initial throat diameter of the Venturi throat diameter position in the target pipeline, and D represents throat diameter of a Venturi straight pipeline section in the target pipeline.

Based on the above corrected volume flux, the volume fluxes of the oil, the water, and the gas under the working condition also can be calculated:

$$Q_{vo} = OVF * Q_v$$

$$Q_{vw} = WVF * Q_v$$

$$Q_{vg} = GVF * Q_v$$

In the equations, $Q_{vo}$ represents volume flux of the oil, $Q_w$ represents volume flux of the water, and $Q_{vg}$ represents volume flux of the gas. In combination with the volume flux of the gas, volume flux $Q_{vgs}$ under standard condition also can be calculated by PVT equation (introducing compression factor):

$$Q_{vgs} = \frac{P_w}{P_s} * \frac{K_s}{K_w} * \frac{Z_{gs}}{Z_{gw}} * Q_{vg}.$$

In the equation, $P_w$ represents working-condition gas pressure, with unit Pa, $K_s$ represents standard-condition thermodynamic temperature, with unit K, $Z_{gs}$ represents standard-condition compressibility factor, P represents standard-condition gas pressure, with unit Pa, $K_w$ represents working-condition thermodynamic temperature, with unit K, and $Z_{gw}$ represents working-condition compressibility factor.

When the flux to be corrected is the total mass flux, an original mass phase fraction in the miscible fluid is first calculated according to the mixing density $\rho_{mis}$:

$$GMF = \frac{GVF * \rho_{gw}}{\rho_{mis}} \; ;$$

$$LMF = 1 - GMF$$

in the equations, $\rho_{gw}$ represents gas density under working condition, GMF represents original mass gas content, and LMF represents original mass liquid content in the miscible fluid, i.e., proportions of the oil and water in the miscible fluid. In this regard, it should be understood that due to influence of gas-liquid slip, this measurement result can only represent instantaneous mass phase fraction. Therefore, based on the above original mass gas content GMF, a corrected mass phase fraction can be obtained:

$$GMF_C = A_{GMF} * GMF + B_{GMF} \; ;$$

$$LMF_C = 1 - GMF_C$$

in the equations, $GMF_C$ represents corrected mass gas content, $LMF_C$ represents corrected mass liquid content, $A_{GMW}$ represents correction coefficient of the mass gas content, and $B_{GMF}$ represents corrected intercept of the mass gas content.

Based on the above corrected mass gas content and the corrected mass liquid content, the corrected volume phase fraction can be inverted:

$$\rho_1 = WMF * \rho_w + OMF * \rho_o$$

$$GVF_C = \frac{\rho_w * GMF_C}{\rho_{gw} * GMF_C + \rho_1 * LMF_C} \; ;$$

$$LVF_C = 1 - GVF_C$$

in the equations, $GVF_C$ represents the corrected gas volume phase fraction, $LVF_C$ represents the corrected liquid volume phase fraction, $\rho_w$ represents the density of the water, and $p_0$ represents the density of the oil.

In combination with the above corrected volume phase fractions, the corrected mixing density $\rho_{misc}$ can be calculated:

$$\rho_{misc} = GVF_C * \rho_{gw} + WVF_C * \rho_w + OVF_C * \rho_o;$$

Based on the above corrected mixing density $\rho_{misc}$, the total mass flux $Q_m$ can be calculated:

$$Q_m = \frac{C}{\sqrt{1-\beta^4}} \varepsilon \frac{\pi}{4}(d-d_s)^2 \sqrt{2\Delta P \rho_{misc}} \; ;$$

$$\beta = \frac{d-d_s}{D-d_s}$$

in the equations, D represents throat diameter of the Venturi straight pipeline section in the target pipeline, $\Delta P$ represents pressure difference value between the upstream pressure tap and the Venturi throat diameter position, $d_s$ represents dirt thickness, d represents initial throat diameter at the Venturi throat diameter in the target pipeline, $\varepsilon$ represents expansion coefficient, and $\rho_{mis}$ represents the mixing density.

Based on the above total mass flux $Q_m$, the corrected total mass flux $Q_{mc}$ can be calculated:

$$Q_{mc} = A_Q * Q_m + B_Q;$$

in the equation, $A_Q$ represents correction coefficient of mass flux, and $B_Q$ represents correction intercept of mass flux.

Based on the above corrected mass flux, the corrected gas mass flux $Q_{ngc}$ can be calculated:

$$Q_{mg} = 3600 * Q_{mc} * GMF_C$$
$$Q_{mgc} = A_g * Q_{mg} + B_g$$

in the equations, $A_g$ represents correction coefficient of gas mass flux, and $B_g$ represents correction intercept of gas mass flux. Besides, the gas mass fluxes calculated each second are accumulated, so that an accumulated flux of the gas mass can be obtained.

Further, the corrected water mass flux $Q_{mwc}$ further can be calculated in the following wa:

$$Q_{mw} = Q_{mlc}WMF_C$$
$$Q_{mwc} = A_w * Q_{mw} + B_w$$

in the equations, $Q_{mlc}$ represents corrected liquid mass flux, $WMF_C$ represents corrected mass water content, $A_w$ represents correction coefficient of water mass flux, and $B_w$ represents correction intercept of water mass flux.

Further, the corrected oil mass flux $Q_{moc}$ can be calculated in the following way:

$$Q_{mo} = Q_{mlc} * OFC_C$$
$$Q_{moc} = A_o Q_{mo} + B_o$$

in the equations, $OMF_C$ represents corrected mass oil content, $A_o$ represents correction coefficient of oil mass flux, and $B_o$ represents correction intercept of oil mass flux.

In combination with the above corrected gas mass flux $Q_{mgc}$ and the corrected water mass flux $Q_{mwc}$, volume flux $Q_{vgs}$ of the gas and volume flux $Q_{vws}$ of the water under standard condition are calculated:

$$Q_{vgs} = \frac{Q_{mgc}}{\rho_{gs}}$$
$$Q_{vws} = \frac{Q_{mwc}}{\rho_{ws}}$$

in the equations, $\rho_{gs}$ represents gas density under the standard condition, and $\rho_{ws}$ represents water density under the standard condition. It is worth indicating that water can be approximately considered as unchanged under the working condition and the standard condition, in other words, $\rho_{ws}$ has the same value as $\rho_w$ in the foregoing embodiments, but has a different meaning, that is, $\rho_w$ simply represents the water density.

To sum up, in combination with the measurement of scaling thickness of the pipeline with the high-energy light quanta, it is realized that real-time online flux metering of each phase of the miscible fluid at the oil-gas wellhead is not affected by the pipeline scaling.

Based on the same inventive concept as that of the method for detecting pipe wall dirt provided in the present embodiment, the present embodiment further provides a device for detecting pipe wall dirt, wherein the device includes at least one software functional module that can be stored in a memory in the form of software or solidified in electronic equipment. A processor in the electronic equipment is configured to execute an executable module stored in the memory, for example, the software functional module, computer program and so on included in the device for detecting pipe wall dirt. Referring to FIG. 6, functionally, the device for detecting pipe wall dirt may include:

a probing module 301, configured to acquire a first receiving amount of a target pipeline for first light quanta currently, wherein the probing module 301 is further configured to acquire a second receiving amount of the target pipeline for the first light quanta at a reference moment; and a processing module 302, configured to obtain an increased dirt thickness of the target pipeline in a target time period according to the first receiving amount and the second receiving amount, wherein the target time period represents a time length from a current moment to the reference moment.

In the present embodiment, the above probing module 301 is configured to implement S101 and S102 in FIG. 3, and the processing module 302 is configured to implement step S103 in FIG. 3. For detailed description of various modules in the above, reference can be made to detailed description of corresponding embodiments, and the details are not repeated in the present embodiment.

Besides, various functional modules in various embodiments of the present disclosure can be integrated together to form one independent part, and it is also possible that various modules exist independently, or that two or more modules are integrated to form one independent part.

It also should be understood that if the above embodiments are realized in the form of a software functional module and is sold or used as an independent product, it can be stored in one computer-readable storage medium. Based on such understanding, the technical solutions in essence or parts making contribution to the prior art or parts of the technical solutions of the present disclosure can be embodied in the form of a software product, and this computer software product is stored in a storage medium, including several instructions for making a computer device (which can be a personal computer, a server or a network device, etc.) execute all or part of the steps of the methods of various embodiments of the present disclosure.

Therefore, the present embodiment further provides a computer-readable storage medium, wherein the computer-readable storage medium stores a computer program, and when the computer program is executed by the processor, the method for detecting pipe wall dirt provided in the present embodiment is implemented. In the above, the computer-readable storage medium may be various media in which program codes can be stored, such as U disk, mobile hard disk, read-only memory (ROM), random access memory (RAM), magnetic disk or optical disk.

Figure 7:
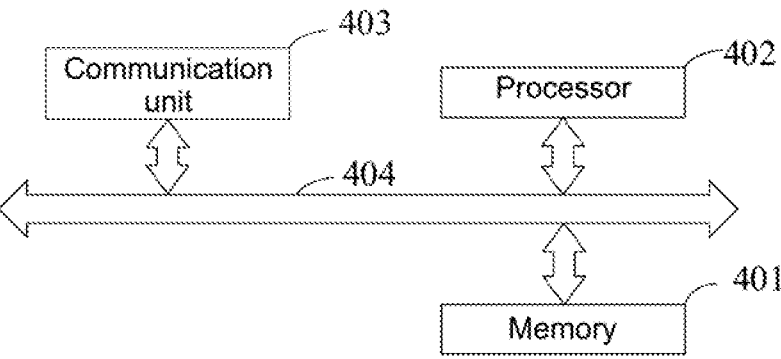
FIG. 7 is a structural schematic diagram of electronic equipment provided in an embodiment of the present disclosure.

The present embodiment provides electronic equipment. As shown in FIG. 7, the electronic equipment includes a processor 402 and a memory 401.

Moreover, the memory 401 stores a computer program, and the processor implements the method for detecting pipe wall dirt provided in the present embodiment by reading and executing the computer program in the memory 401 corresponding to the above embodiments.

With continued reference to FIG. 7, the electronic equipment further includes a communication unit 403. Various elements of the memory 401, the processor 402, and the communication unit 403 are electrically connected to each other directly or indirectly through a system bus 404, so as to realize transmission or interaction of data.

In the above, the memory 401 may be an information recording device based on any electronic, magnetic, optical, or other physical principles for recording an execution instruction, data, or the like. In some embodiments, this memory 401 may be, but is not limited to, a volatile memory, a non-volatile memory, a storage drive, etc.

In some embodiments, this volatile memory may be a random access memory (RAM). In some embodiments, this non-volatile memory may be a read only memory (ROM), a programmable read-only memory (PROM), an erasable programmable read-only memory (EPROM), an electric erasable programmable read-only memory (EEPROM), a flash memory and so on. In some embodiments, the memory driver may be a disc driver, a solid state disk, a memory disk of any type (e.g., optical disk and DVD), or a similar storage medium, or combinations thereof.

This communication unit 403 is configured to transmit and receive data through network. In some embodiments, this network may include wired network, wireless network, fiber optic network, telecommunication network, the Intranet, the Internet, local area network (LAN), wide area network (WAN), wireless local area networks (WLAN), metropolitan area network (MAN), wide area network (WAN), public switched telephone network (PSTN), bluetooth network, ZigBee network, or near field communication (NFC) network and so on, or any combination thereof. In some embodiments, the network may include one or more network access points. For example, the network may include a wired or wireless network access point, such as a base station and/or a network switching node, and one or more components of a service request processing system can be connected to the network through this access point, so as to exchange data and/or information.

The processor 402 may be an integrated circuit chip, with a signal processing function, and this processor may include one or more processing cores (for example, a single-core processor or a multi-core processor). By way of example only, the above processor may include a central processing unit (CPU), an application specific integrated circuit (ASIC), an application specific instruction-set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computing (RISC), a microprocessor, or the like, or any combination thereof.

It should be understood that the device and the method disclosed in the above embodiments also can be implemented in other modes. The device embodiments described above are merely exemplary, for example, the flowcharts and the block diagrams in the drawings show possibly implemented system architectures, functions, and operations of the device, method, and computer program products according to multiple embodiments of the present disclosure. In this regard, each block in the flowcharts or block diagrams may represent one module, a program segment, or part of code, the module, the program segment, or the part of code contains one or more executable instructions for implementing a specified logical function. It also should be noted that, in some alternative embodiments, the functions noted in the blocks may also occur out of the order marked in the drawings. For example, two successive blocks may in fact be executed substantially in parallel, or they sometimes also may be executed in a reverse order, which depends upon the function involved. It is also noted that each block of the block diagrams and/or flowcharts, and combinations of blocks in the block diagrams and/or flowcharts, may be implemented in dedicated hardware-based systems that perform specified functions or actions, or may be implemented by a combination of dedicated hardware and computer instructions.

The above-mentioned are merely various embodiments of the present disclosure, but the scope of protection of the present disclosure is not limited thereto, and any change or substitution that may easily occur to those skilled in the present art within the technical scope disclosed in the present disclosure should be covered within the scope of protection of the present disclosure. Therefore, the scope of protection of the present disclosure should be based on the scope of protection of the claims.

What is claimed is:

1. A method for detecting pipe wall dirt, comprising steps of:

acquiring a first receiving amount of a target pipeline for first light quanta currently;

acquiring a second receiving amount of the target pipeline for the first light quanta at a reference moment; and obtaining an increased dirt thickness of the target pipeline in a target time period according to the first receiving amount and the second receiving amount, wherein the target time period represents a time length from a current moment to the reference moment.

2. The method for detecting pipe wall dirt according to claim 1, wherein an equation of the step of obtaining an increased dirt thickness of the target pipeline in a target time period according to the first receiving amount and the second receiving amount is:

$$d_s = \ln\left(\frac{N_{old}^{356}}{N_{new}^{356}}\right)/u_s;$$

in the equation, $d_s$ represents the dirt thickness, $$N_{new}^{356}$$

represents the first receiving amount, $$N_{old}^{365}$$

represents the second receiving amount, and $u_s$ represents absorption coefficient of dirt to the light quanta.

3. The method for detecting pipe wall dirt according to claim 1, wherein the method further comprises:

determining a mixing density of a flowing medium in the target pipeline according to the dirt thickness; and determining a current medium flux of the flowing medium according to the dirt thickness and the mixing density.

4. The method for detecting pipe wall dirt according to claim 3, wherein the step of determining a mixing density of a flowing medium in the target pipeline according to the dirt thickness comprises steps of:

determining a medium thickness of each component in the flowing medium according to the dirt thickness;

determining a volume phase fraction of respective component according to the medium thickness of each component; and determining the mixing density of the flowing medium according to the volume phase fraction of the respective component.

5. The method for detecting pipe wall dirt according to claim 4, wherein the flowing medium is a miscible fluid exploited from oil and gas fields, components in the miscible fluid comprise gas, oil, and water, and the step of determining a medium thickness of each component in the flowing medium according to the dirt thickness comprises:

acquiring a third receiving amount of the target pipeline for second light quanta currently and a fourth receiving amount of the target pipeline for the second light quanta when the target pipeline is currently in an empty state;

acquiring a fifth receiving amount of the target pipeline for third light quanta currently and a sixth receiving amount of the target pipeline for the third light quanta when the target pipeline is currently in an empty state; and determining respective medium thickness of the gas, the oil, and the water according to the third receiving amount, the fourth receiving amount, the fifth receiving amount, the sixth receiving amount, and the dirt thickness, with equations as follows:

$$d_o = \frac{A_{12a} * B_b - A_{12b} * B_a}{A_{12a} * A_{13b} - A_{12b} * A_{13a}}$$

$$d_w = \frac{A_{13a} * B_b - A_{13b} * B_b}{A_{12b} * A_{13a} - A_{13b} * A_{12a}}$$

$$d_g = 1 - d_o + d_w$$

$$A_{13a} = u_{g31} - u_{o31}$$

$$A_{13b} = u_{g81} - u_{o81}$$

$$A_{12a} = u_{g31} - u_{w81}$$

$$A_{12b} = u_{g81} - u_{w81}$$

$$B_a = d * u_{g31} - \ln\left(\frac{N_{31}}{N_{new}^{31}}\right)$$

$$B_b = d * u_{g81} - \ln\left(\frac{N_{81}}{N_{new}^{81}}\right);$$

in the equations, d represents initial throat diameter of a Venturi throat diameter position in the target pipeline, and $d_o$ represents the medium thickness of the oil; $d_g$ represents thickness of the gas; $d_w$ represents the medium thickness of the water;

$$N_{new}^{31}$$

represents the third receiving amount, $N_{31}$ represents the fourth receiving amount;

$$N_{new}^{81}$$

represents the fifth receiving amount; $N_{81}$ represents the sixth receiving amount; $u_{o31}$ represents absorption coefficient of the oil to the second light quanta, and $u_{g31}$ represents absorption coefficient of the gas to the second light quanta; $u_{w31}$ represents absorption coefficient of the water to the second light quanta; $u_{o81}$ represents absorption coefficient of the oil to the third light quanta, and $u_{g81}$ represents absorption coefficient of the gas to the third light quanta; $u_{w81}$ represents absorption coefficient of the water to the third light quanta, $A_{13a}$ represents alternative variable of formula $u_{g31} - u_{o31}$, $A_{13b}$ represents alternative variable of formula $u_{g81} - u_{o81}$, $A_{12a}$ represents alternative variable of formula $u_{g31} - u_{w81}$, $A_{12b}$ represents alternative variable of formula $u_{g81} - u_{w81}$, $B_a$ represents alternative variable of formula $$d * u_{g31} - \ln\left(\frac{N_{31}}{N_{new}^{31}}\right),$$

and $B_b$ represents alternative variable of formula $$d * u_{g81} - \ln\left(\frac{N_{81}}{N_{new}^{81}}\right).$$

6. The method for detecting pipe wall dirt according to claim 4, wherein the flowing medium is a miscible fluid exploited from oil and gas fields, components of the miscible fluid comprise gas, oil, and water, and an equation of the step of determining the mixing density of the flowing medium according to the volume phase fraction of the respective component is as follows:

$$\rho_{mis} = GVF * \rho_g + WVF * \rho_w + OVF * \rho_o;$$

in the equation, $\rho_{mis}$ represents the mixing density; GVF represents volume phase fraction of the gas, WVF represents volume phase fraction of the water, and OVF represents volume phase fraction of the oil; $\rho_g$ represents density of the gas, $\rho_w$ represents density of the water, and $\rho_o$ represents density of the oil.

7. The method for detecting pipe wall dirt according to claim 3, wherein the medium flux is a total volume flux, and equations of the step of determining a current medium flux of the flowing medium according to the dirt thickness and the mixing density are as follows:

$$Q_v = \frac{C}{\sqrt{1 - \beta^4}} \varepsilon \frac{\pi}{4} (d - d_s)^2 \sqrt{\frac{2\Delta P}{\rho_{mis}}};$$

$$\beta = \frac{d - d_s}{D - d_s}$$

in the equations, $Q_v$ represents current total volume flux of the flowing medium, C represents discharge coefficient, $\varepsilon$ represents expansion coefficient, $\Delta p$ represents pressure difference value between an upstream pressure tap and a Venturi throat diameter position, $\rho_{mis}$ represents the mixing density, $d_s$ represents the dirt thickness, d represents initial throat diameter at Venturi throat diameter in the target pipeline, and D represents throat diameter of a Venturi straight pipeline section in the target pipeline.

8. A storage medium, storing a computer program, wherein the computer program, when executed by a processor, implements the method for detecting pipe wall dirt according to claim 1.

9. The storage medium according to claim 8, wherein an equation of the step of obtaining an increased dirt thickness of the target pipeline in a target time period according to the first receiving amount and the second receiving amount is:

$$d_s = \ln\left(\frac{N_{old}^{356}}{N_{new}^{356}}\right) \Big/ u_s;$$

in the equation, $d_s$ represents the dirt thickness, $$N_{new}^{356}$$

represents the first receiving amount, $$N_{old}^{365}$$

represents the second receiving amount, and $u_s$ represents absorption coefficient of dirt to the light quanta.

10. The storage medium according to claim 8, wherein the method further comprises:

determining a mixing density of a flowing medium in the target pipeline according to the dirt thickness; and determining a current medium flux of the flowing medium according to the dirt thickness and the mixing density.

11. The storage medium according to claim 10, wherein the step of determining a mixing density of a flowing medium in the target pipeline according to the dirt thickness comprises steps of:

determining a medium thickness of each component in the flowing medium according to the dirt thickness;

determining a volume phase fraction of respective component according to the medium thickness of each component; and determining the mixing density of the flowing medium according to the volume phase fraction of the respective component.

12. The storage medium according to claim 11, wherein the flowing medium is a miscible fluid exploited from oil and gas fields, components in the miscible fluid comprise gas, oil, and water, and the step of determining a medium thickness of each component in the flowing medium according to the dirt thickness comprises:

acquiring a third receiving amount of the target pipeline for second light quanta currently and a fourth receiving amount of the target pipeline for the second light quanta when the target pipeline is currently in an empty state;

acquiring a fifth receiving amount of the target pipeline for third light quanta currently and a sixth receiving amount of the target pipeline for the third light quanta when the target pipeline is currently in an empty state; and determining respective medium thickness of the gas, the oil, and the water according to the third receiving amount, the fourth receiving amount, the fifth receiving amount, the sixth receiving amount, and the dirt thickness, with equations as follows:

$$d_o = \frac{A_{12a}*B_b - A_{12b}*B_a}{A_{12a}*A_{13b} - A_{12b}*A_{13a}}$$

-continued $$d_w = \frac{A_{13a}*B_b - A_{13b}*B_b}{A_{12b}*A_{13a} - A_{13b}*A_{12a}}$$

$$d_g = 1 - d_o + d_w$$

$$A_{13a} = u_{g31} - u_{o31}$$

$$A_{13b} = u_{g81} - u_{o81}$$

$$A_{12a} = u_{g31} - u_{w31}$$

$$A_{12b} = u_{g81} - u_{w81}$$

$$B_a = d*u_{g31} - \ln\left(\frac{N_{31}}{N_{new}^{31}}\right)$$

$$B_b = d*u_{g81} - \ln\left(\frac{N_{81}}{N_{new}^{81}}\right);$$

in the equations, d represents initial throat diameter of a Venturi throat diameter position in the target pipeline, and $d_o$ represents the medium thickness of the oil; $d_g$ represents thickness of the gas; $d_w$ represents the medium thickness of the water;

$$N_{new}^{31}$$

represents the third receiving amount, $N_{31}$ represents the fourth receiving amount;

$$N_{new}^{81}$$

represents the fifth receiving amount; $N_{81}$ represents the sixth receiving amount; $u_{o31}$ represents absorption coefficient of the oil to the second light quanta, and $u_{g31}$ represents absorption coefficient of the gas to the second light quanta; $u_{w31}$ represents absorption coefficient of the water to the second light quanta; $u_{o81}$ represents absorption coefficient of the oil to the third light quanta, and $u_{g81}$ represents absorption coefficient of the gas to the third light quanta; $u_{w81}$ represents absorption coefficient of the water to the third light quanta, $A_{13a}$ represents alternative variable of formula $u_{g31} - u_{o31}$, $A_{13}$, represents alternative variable of formula $u_{g81} - u_{o81}$, $A_{12a}$ represents alternative variable of formula $u_{g31} - u_{w81}$, $A_{12b}$ represents alternative variable of formula $u_{g81} - u_{w81}$, $B_a$ represents alternative variable of formula $$d*u_{g31} - \ln\left(\frac{N_{31}}{N_{new}^{31}}\right),$$

and $B_b$ represents alternative variable of formula $$d*u_{g81} - \ln\left(\frac{N_{81}}{N_{new}^{81}}\right).$$

13. The storage medium according to claim 11, wherein the flowing medium is a miscible fluid exploited from oil and gas fields, components of the miscible fluid comprise gas, oil, and water, and an equation of the step of determining the mixing density of the flowing medium according to the volume phase fraction of the respective component is as follows:

$$\rho_{mis} = GVF * \rho_g + WVF * \rho_w + OVF * \rho_o;$$

in the equation, $\rho_{mis}$ represents the mixing density; GVF represents volume phase fraction of the gas, WVF represents volume phase fraction of the water, and OVF represents volume phase fraction of the oil; $\rho_g$ represents density of the gas, $\rho_w$ represents density of the water, and $\rho_o$ represents density of the oil.

14. The storage medium according to claim 10, wherein the medium flux is a total volume flux, and equations of the step of determining a current medium flux of the flowing medium according to the dirt thickness and the mixing density are as follows:

$$Q_v = \frac{C}{\sqrt{1-\beta^4}} \varepsilon \frac{\pi}{4} (d-d_s)^2 \sqrt{\frac{2\Delta P}{\rho_{mis}}};$$

$$\beta = \frac{d-d_s}{D-d_s}$$

in the equations, $Q_v$ represents current total volume flux of the flowing medium, C represents discharge coefficient, $\varepsilon$ represents expansion coefficient, $\Delta p$ represents pressure difference value between an upstream pressure tap and a Venturi throat diameter position, $\rho_{mis}$ represents the mixing density, $d_s$ represents the dirt thickness, d represents initial throat diameter at Venturi throat diameter in the target pipeline, and D represents throat diameter of a Venturi straight pipeline section in the target pipeline.

15. Electronic equipment, comprising a processor and a memory, wherein the memory stores a computer program, and the computer program, when executed by the processor, implements the method for detecting pipe wall dirt according to claim 1.

16. The Electronic equipment according to claim 15, wherein an equation of the step of obtaining an increased dirt thickness of the target pipeline in a target time period according to the first receiving amount and the second receiving amount is:

$$d_s = \ln\left(\frac{N_{old}^{356}}{N_{new}^{356}}\right) / u_s;$$

in the equation, $d_s$ represents the dirt thickness, $$N_{new}^{356}$$

represents the first receiving amount, $$N_{old}^{365}$$

represents the second receiving amount, and $u_s$ represents absorption coefficient of dirt to the light quanta.

17. The Electronic equipment according to claim 15, wherein the method further comprises:

determining a mixing density of a flowing medium in the target pipeline according to the dirt thickness; and determining a current medium flux of the flowing medium according to the dirt thickness and the mixing density.

18. The Electronic equipment according to claim 17, wherein the step of determining a mixing density of a flowing medium in the target pipeline according to the dirt thickness comprises steps of:

determining a medium thickness of each component in the flowing medium according to the dirt thickness;

determining a volume phase fraction of respective component according to the medium thickness of each component; and determining the mixing density of the flowing medium according to the volume phase fraction of the respective component.

19. The Electronic equipment according to claim 18, wherein the flowing medium is a miscible fluid exploited from oil and gas fields, components in the miscible fluid comprise gas, oil, and water, and the step of determining a medium thickness of each component in the flowing medium according to the dirt thickness comprises:

acquiring a third receiving amount of the target pipeline for second light quanta currently and a fourth receiving amount of the target pipeline for the second light quanta when the target pipeline is currently in an empty state;

acquiring a fifth receiving amount of the target pipeline for third light quanta currently and a sixth receiving amount of the target pipeline for the third light quanta when the target pipeline is currently in an empty state; and determining respective medium thickness of the gas, the oil, and the water according to the third receiving amount, the fourth receiving amount, the fifth receiving amount, the sixth receiving amount, and the dirt thickness, with equations as follows:

$$d_o = \frac{A_{12a} * B_b - A_{12b} * B_a}{A_{12a} * A_{13b} - A_{12b} * A_{13a}}$$

$$d_w = \frac{A_{13a} * B_b - A_{13b} * B_b}{A_{12b} * A_{13a} - A_{13b} * A_{12a}}$$

$$d_g = 1 - d_o + d_w$$

$$A_{13a} = u_{g31} - u_{o31}$$

$$A_{13b} = u_{g81} - u_{o81}$$

$$A_{12a} = u_{g31} - u_{w81}$$

$$A_{12b} = u_{g81} - u_{w81}$$

$$B_a = d * u_{g31} - \ln\left(\frac{N_{31}}{N_{new}^{31}}\right)$$

$$B_b = d * u_{g81} - \ln\left(\frac{N_{81}}{N_{new}^{81}}\right);$$

in the equations, d represents initial throat diameter of a Venturi throat diameter position in the target pipeline, and $d_o$ represents the medium thickness of the oil; $d_g$ represents thickness of the gas; $d_w$ represents the medium thickness of the water;

$$N_{new}^{31}$$

represents the third receiving amount, $N_{31}$ represents the fourth receiving amount;

$$N_{new}^{81}$$

represents the fifth receiving amount; $N_{81}$ represents the sixth receiving amount; $u_{o31}$ represents absorption coefficient of the oil to the second light quanta, and $u_{g31}$ represents absorption coefficient of the gas to the second light quanta; $u_{w31}$ represents absorption coefficient of the water to the second light quanta; $u_{o81}$ represents absorption coefficient of the oil to the third light quanta, and $u_{g81}$ represents absorption coefficient of the gas to the third light quanta; $u_{w81}$ represents absorption coefficient of the water to the third light quanta, $A_{13a}$ represents alternative variable of formula $u_{g3}-u_{o31}$, $A_{13b}$ represents alternative variable of formula $u_{g81}-u_{o81}$, $A_{12a}$ represents alternative variable of formula $u_{g31}-u_{w81}$, $A_{12b}$ represents alternative variable of formula $u_{g81}-u_{w81}$, $B_a$ represents alternative variable of formula $$d * u_{g31} - \ln\left(\frac{N_{31}}{N_{new}^{31}}\right),$$

and $B_b$ represents alternative variable of formula $$d * u_{g81} - \ln\left(\frac{N_{81}}{N_{new}^{81}}\right).$$

20. A device for detecting pipe wall dirt, comprising:
a probing module, configured to acquire a first receiving amount of a target pipeline for first light quanta currently, wherein
the probing module is further configured to acquire a second receiving amount of the target pipeline for the first light quanta at a reference moment; and
a processing module, configured to obtain an increased dirt thickness of the target pipeline in a target time period according to the first receiving amount and the second receiving amount, wherein the target time period represents a time length from a current moment to the reference moment.

* * * * *